United States Patent
Scott (10) Patent No.: US 8,704,845 B2
(45) Date of Patent: Apr. 22, 2014

(54) METHODS AND SYSTEMS FOR FULL-COLOR THREE-DIMENSIONAL IMAGE DISPLAY

(75) Inventor: Miles L. Scott, Rohnert Park, CA (US)

(73) Assignee: Doubleshot, Inc., Santa Clara, CA (US)

( * ) Notice: Subject to any disclaimer, the term of this patent is extended or adjusted under 35 U.S.C. 154(b) by 0 days.

(21) Appl. No.: 13/459,939

(22) Filed: Apr. 30, 2012

(65) Prior Publication Data

US 2013/0083084 A1    Apr. 4, 2013

Related U.S. Application Data

(63) Continuation of application No. 12/243,704, filed on Oct. 1, 2008, now Pat. No. 8,169,445.

(60) Provisional application No. 60/976,794, filed on Oct. 1, 2007.

(51) Int. Cl.
| | | |
|---|---|---|
| G09G 5/00 | (2006.01) | |
| G09G 5/02 | (2006.01) | |
| G06T 15/00 | (2011.01) | |
| G06K 9/40 | (2006.01) | |
| H04N 5/46 | (2006.01) | |
| H04N 9/12 | (2006.01) | |
| H04N 1/46 | (2006.01) | |
| G02F 1/1335 | (2006.01) | |

(52) U.S. Cl.
USPC ............. 345/589; 345/419; 345/581; 345/32; 345/690; 348/557; 348/742; 348/E13.002; 348/E13.053; 358/512; 349/106; 382/260; 382/274

(58) Field of Classification Search
USPC ............ 345/419, 581, 32, 690, 589; 348/557, 348/742; 358/512; 349/106; 382/254, 260, 382/274
See application file for complete search history.

(56) References Cited

U.S. PATENT DOCUMENTS

| | | | | |
|---|---|---|---|---|
| 4,007,481 A | * | 2/1977 | St. John | 348/41 |
| 6,100,895 A | * | 8/2000 | Miura et al. | 345/426 |

(Continued)

FOREIGN PATENT DOCUMENTS

| | | |
|---|---|---|
| DE | 100 57 102 A1 | 5/2002 |
| WO | WO 98/33331 | 7/1998 |

(Continued)

OTHER PUBLICATIONS

International Search Report and Written Opinion of the International Searching Authority for International Application No. PCT/US2008/011386, mailed Feb. 2, 2009, 18 pages.

*Primary Examiner* — Wesner Sajous (74) *Attorney, Agent, or Firm* — Finnegan, Henderson, Farabow, Garrett & Dunner LLP (57) ABSTRACT

Methods and systems for displaying full-color three-dimensional imagery are provided. A first color set, having a first color spectrum, is defined to include a first set of LEDs. The first color set is assigned to a first color-coded image perspective. A second color set, having a second color spectrum, is defined to include a second set of LEDs. The second color set is assigned to a second color-coded image perspective. The full-color three-dimensional imagery is caused by activating, alternatively, at least two LEDs of the first color set or the second color set and one LED of a remaining color set and displaying the three-dimensional image based on the first image perspective and the second image perspective.

17 Claims, 6 Drawing Sheets

(56) References Cited

U.S. PATENT DOCUMENTS

| | | |
|---|---|---|
| 8,029,139 B2 | 10/2011 | Ellinger et al. |
| 8,169,445 B2 * | 5/2012 | Scott .............................. 345/581 |
| 8,177,367 B2 | 5/2012 | Ellinger et al. |
| 2003/0100837 A1 * | 5/2003 | Lys et al. ....................... 600/476 |
| 2004/0012670 A1 * | 1/2004 | Zhang ............................ 348/46 |
| 2007/0216617 A1 * | 9/2007 | Handschy et al. .............. 345/84 |
| 2007/0247709 A1 * | 10/2007 | Karakawa ..................... 359/464 |
| 2008/0183081 A1 * | 7/2008 | Lys et al. ....................... 600/477 |
| 2010/0164974 A1 * | 7/2010 | Fairclough .................... 345/582 |
| 2011/0025826 A1 * | 2/2011 | Dabiri et al. ................... 348/47 |
| 2011/0205251 A1 | 8/2011 | Auld |
| 2012/0212487 A1 | 8/2012 | Basler et al. |

FOREIGN PATENT DOCUMENTS

| | | |
|---|---|---|
| WO | WO 2005/099279 A1 | 10/2005 |
| WO | WO 2007/008109 A1 | 1/2007 |
| WO | WO 2008/061511 A1 | 5/2009 |

* cited by examiner

//METHODS AND SYSTEMS FOR FULL-COLOR THREE-DIMENSIONAL IMAGE DISPLAY

CROSS-REFERENCE TO RELATED APPLICATIONS

This application is a continuation of U.S. patent application Ser. No. 12/243,704, filed Oct. 1, 2008 now U.S. Pat. No. 8,169,445, which claims the benefit of priority of U.S. Provisional Application No. 60/976,794, filed Oct. 1, 2007, entitled "Full Color Anaglyph 3D Monitor," the disclosure of which is expressly incorporated herein by reference in its entirety.

BACKGROUND

1. Technical Field

Embodiments consistent with the presently-claimed invention are related to display systems and, in particular, to methods for displaying full-color anaglyph three-dimensional imagery.

2. Discussion of Related Art

Three-dimensional display systems have gained increasing popularity due, in part, to advances in image processing and display technology. Some of these advances have been applied in a variety of applications, including virtual reality flight simulators, automotive design, oil and gas exploration, and image-guided surgical procedures.

One common three-dimensional display technology is a stereoscopic display. Stereoscopic displays may use any one of several methods to generate a three-dimensional image by presenting a viewer with different perspectives of a common image. For example, many of the methods code and decode at least two different perspectives of a common image using at least two separate optical channels. Coding and decoding methods may be based on color, polarization, spatial separation, or time. The coded images are often similar, but offset with respect to one another. When viewed by a user, the disparity in the images is interpreted by the brain as depth.

An anaglyph, for example, is stereoscopic display method that uses color to code and decode separate image perspectives. Using color, an anaglyph method codes and decodes the image perspective based on one or more wavelengths corresponding to a portion of the visible light spectrum. The color-coded images are presented to a viewer wearing appropriately color filtered glasses. In operation, left-image data may be placed in an optical channel corresponding to the color red in the visible light spectrum. Similarly, right-eye image data may be placed in another optical channel corresponding to the colors green and blue in the visible light spectrum. Each image is offset with respect to each other, producing a depth effect. The brain integrates the two color-coded images, creating a three-dimensional image.

In certain situations, however, three-dimensional display systems using anaglyphs may cause visual discomfort. In some cases, visual discomfort may result from each eye receiving a separate limited color spectrum as described above. Other stereoscopic methods may provide improved color representation. For example, some methods use multiple projectors with complementary polarizers to produce three-dimensional imagery. Many of these methods, however, suffer from other undesirable effects, including flicker, reduced brightness, and optical cross talk. Furthermore, many of these alternative methods are considerably more expensive than anaglyph methods.

SUMMARY

Methods and systems for displaying full-color three-dimensional imagery are provided. A first color set, having a first color spectrum, is defined to include a first set of LEDs. The first color set is assigned to a first color-coded image perspective. A second color set, having a second color spectrum, is defined to include a second set of LEDs. The second color set is assigned to a second color-coded image perspective. The full-color three-dimensional imagery is caused by activating, alternatively, at least two LEDs of the first color set or the second color set and one LED of a remaining color set and displaying the three-dimensional image based on the first image perspective and the second image perspective.

In some embodiments, both color sets may be produced by one broadband illumination system or set of LEDs. The resulting broadband light source may be separated into two color sets by an array of filters that operate on the light emanating from the pixels on a pixel, row, or column basis.

In some embodiments, the first color spectrum includes wavelengths corresponding to each of a first red LED, a first green LED, and a first blue LED.

In certain embodiments, the second color spectrum includes wavelengths corresponding to each of a second red LED, a second green LED, and a second blue LED.

In certain embodiments, the first color spectrum is different from the second color spectrum. The first color-coded image perspective and the second color-coded image perspective may correspond to one of a right-eye image and a left-eye image.

In certain embodiments, the at least two LEDs of the first color set or the second color set include a red LED and a blue LED, and the one LED of the remaining color set is a green LED.

In some embodiments, a multi-spectral imagery is displayed that includes thermal, infrared, or acoustic imagery coded using single wavelength It is to be understood that both the foregoing general description and the following detailed description are exemplary and explanatory only and are not restrictive of the invention. Further embodiments and aspects of the presently-claimed invention are described with reference to the accompanying drawings, which are incorporated in and constitute a part of this specification.

DETAILED DESCRIPTION

Reference will now be made in detail to the embodiments, examples of which are illustrated in the accompanying drawings. Wherever possible, the same reference numbers will be used throughout the drawings to refer to the same or like parts.

Figure 1:
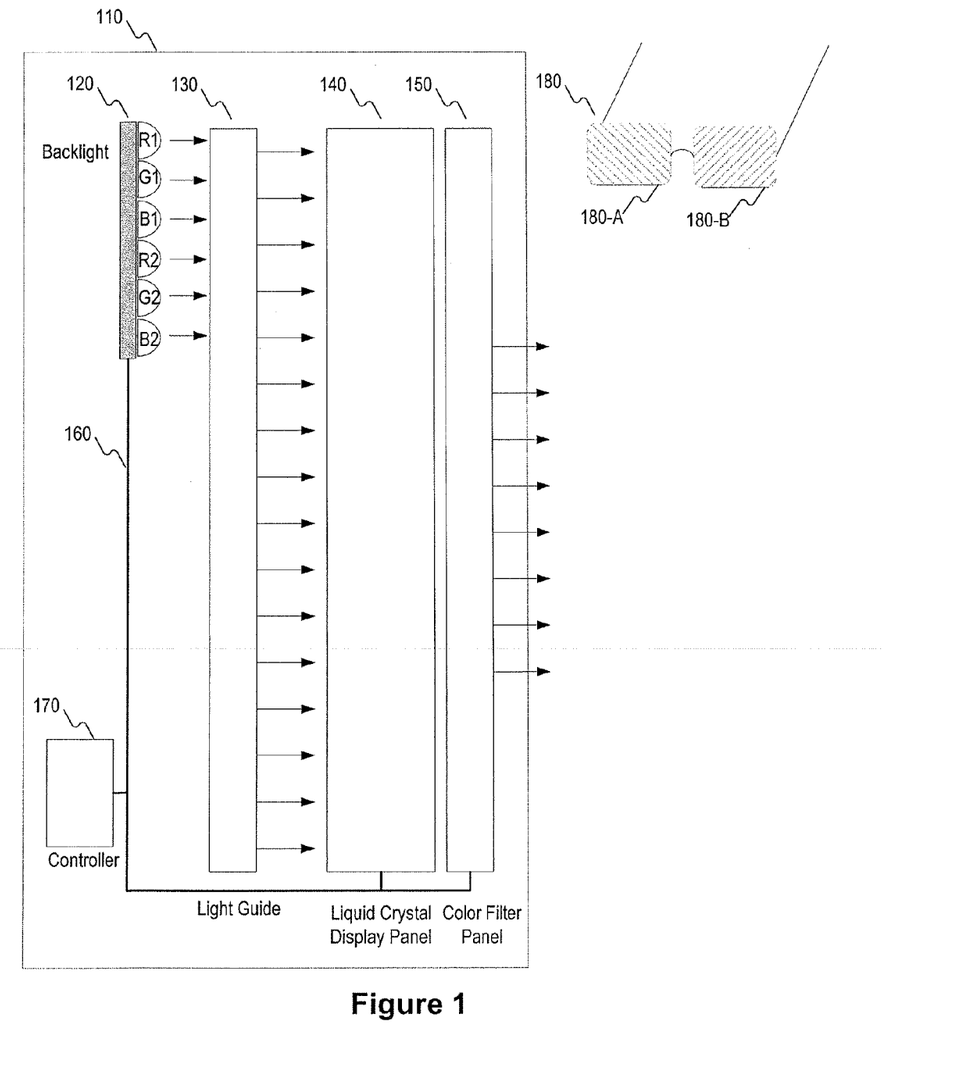
FIG. 1 shows a block diagram illustrating an exemplary system for providing a full-color three-dimensional display.

FIG. 1 shows a block diagram illustrating exemplary full-color three-dimensional display system 100. In some embodiments, display system 100 may be associated with a media display system, an entertainment display system, a television, a desktop or mobile computer, a digital still or a digital video camera, a personal media player, a mobile phone, or like device. In other embodiments, display system may be a component of a virtual reality system, an engineering design system, a medical device, or other like device.

As shown in FIG. 1, system 100 may include, among other features, display device 110 and viewing device 180. Display device 110 may include, among other features, backlight 120, light guide 130, color or monochrome liquid crystal display (LCD) panel 140, color filter panel 150, bus 160, and controller 170. Viewing device 180 may include, among other features, right eye filter 180-A and left eye filter 180-B with each filter having a bandpass that matches a different one of the color set outputs provided by color panel 150.

In certain embodiments, display device 110 may be adapted to output information coded as full-color anaglyph three-dimensional imagery or as standard two dimensional imagery. Information may include one or a combination of images, text, video, or the like. In some embodiments, display device 110 may output imagery using, among other components, one or a combination of flat panel technologies, such as plasma, liquid crystal and light-emitting diode. In certain embodiments, display device 110 may also output imagery using, among other components, micro display technologies, such as Liquid Crystal on Silicon (LCOS), electro-optic modulators, and micro-electromechanical systems. For example, display device 110 may be a liquid crystal display (LCD) as illustrated in FIG. 1. In other examples, display device 110 may be a system that includes a projector and a screen wherein the color panel is in the projector. Display device 110 may be used in conjunction with viewing device 180 adapted to view imagery generated by display device 110.

Backlight 120 may be a light source configured to output one or more coded image perspectives of a three-dimensional image. For example, backlight 120 may be configured to utilize anyone of several color models sufficient to reproduce a color spectrum to support full-color anaglyph three-dimensional imagery or pseudo color multi-spectral image fusion. For example, the light source may consist of florescent, LED, arc lamp, laser, or any other sources which may be configured to output the required wavelengths of light as determined by the design of color filter panel 150. In some embodiments, backlight 120 may be adapted to use an additive color model, such as RGB. Using the RGB color model, varying intensities and bandwidths of a red, a green, and a blue light sources may be combined to produce a broad color spectrum. Backlight 120 may include a red LED, a green LED, and a blue LED. In other embodiments, backlight 120 may be adapted to utilize alternative color models, such as a four color space or a six color space model. Accordingly, in some embodiments, backlight 120 may include one or a combination of differently colored LEDs, including combinations of greater than and less than three colors.

In some embodiments, backlight 120 may include LEDs grouped as a color set, each color set configured to produce a particular color spectrum. The color spectrum of the color set may correspond to a portion of the visible light spectrum used to code an individual image perspective (left or right) of a three-dimensional image. That is, one set of LEDs corresponding to a color set may be configured to display only one of the two image perspectives. Similarly, the remaining set of LEDs corresponding to another color set may be configured to only display the other image perspective. An individual image perspective may be associated with either a left-eye image or a right-eye image. Right eye filter 180-A and left eye filter 180-B may be configured to receive image data on separate optical channels differentiate based on wavelengths corresponding to each color set. For example, one optical channel may be configured to carry information coded based on left-eye image perspective and the other optical channel may be configured to carry information coded based on the right-eye image perspective. That is, each color set may be associated with an optical channel to transmit and receive a particular image perspective.

In some embodiments, the transmission range of the color set may be determined based on the wavelengths associated with the LEDs comprising the color set. For example, backlight 120 may include a first color set comprised of red LED $R_1$, green LED $G_1$, and blue LED $B_1$. Backlight 120 may also include a second color set comprised of red LED $R_2$, green $G_2$, and blue LED $B_2$, each LED having a different wavelength compared the corresponding LED in the first color set. Thus, a first color set may correspond to color spectrum, or color space, used to code either a right-eye or left-eye image perspective of three-dimensional image. Similarly, the second color set may correspond to the remaining image perspective. In some embodiments, backlight 120 may include other color sets with at least one red LED, one green LED, and one blue LED. For example, a first color set may include red LED $R_1$, green LED $G_2$, and blue LED $B_1$. Similarly, a second color set may include red LED $R_2$, green LED $G_1$, and blue LED $B_2$.

A particular color space reproduced using a corresponding color set may be a subset of the visible light spectrum. That is, colors used to code and to display a particular image perspective may be reproduced to the extent that those colors are reproducible using the combination of colors included in the corresponding color set in backlight 120. In certain embodiments, backlight 120 may comprise color sets that include four or greater distinct LED colors in each color set to increase the reproducible subset of the visible light spectrum. For example, one color set may include, in addition to a red, green, and blue LED, a cyan LED. The complementary color set may include the same color LEDs, yet each color may differ slightly in wavelength as previously discussed. Alternatively, the complementary color set may contain base color LEDs, red, green, and blue, adding a yellow LED.

In some applications, additional color LEDs, beyond the base color red, green, and blue LEDs, may be used to display multi-spectral imagery on a single display panel. For example, a right-eye image perspective may be coded using a red, a green, and a blue LED from a first color set. Similarly, a left-eye image perspective may be coded using different red, green, and blue LEDs from a complementary color set. A yellow LED associated with either the first color or the second color set may be coded to display pseudo color spectral imagery, such as thermal imagery, separately or in combination with the right and the left image perspectives. Pseudo color spectral imagery may be displayed in varying hues, or shades, of a single color. For example, a pixel coded with eight bits of information can represent a larger range of colors than a representation in the same color space that uses six bits of information. Accordingly, a single color may be reproduced in varying shades based on the associated pixel resolution.

Light guide 130 may include an optical component adapted to evenly distribute light from backlight 120 across LCD panel 140. For example, light guide 130 may be optically coupled to backlight 120 using one or a combination of a mixing light guide (not shown) and a mirror (not shown). Light guide 130 may be composed of glass, acrylic, or other polymethacrylate material, suitable to couple light from backlight 120 to LCD panel 140. Light guide 130 may include an extraction pattern on one surface adapted to provide uniform coupling of light output from backlight 120 to LCD panel 140. The extraction pattern may be created using several methods, including but not limited to, screen printing and injection molding.

Liquid crystal display (LCD) panel 140 may include an array of liquid crystal light valves associated with one of several picture elements, or pixels, forming the display. LCD panel 140 may be coupled to receive light from backlight 120 through light guide 130. Each liquid crystal light valve may be coupled to transmit light from backlight 120 through color filter panel 150. In some embodiments, a light valve may be configured as a layered structure that includes a pair of complementary polarizers, a liquid crystal, and a pair of glass plates. One glass plate may be covered by a transparent electrode and the other coated to provide the electronics, such as thin film transistors (TFT)s, necessary to address and drive the individual pixels. Each liquid crystal light valve may be individually addressable by controller 170 to vary the amount of light emanating from the pixel in response to applying a voltage across the electrodes. In some embodiments, each pixel may be subdivided into sub pixels or unit pixels, each associated with an individual liquid crystal light valve. A sub pixel may be coated with a color filter to pass a particular wavelength and to reflect or absorb other wavelengths.

Color filter panel 150 may include an array of colored filter elements adapted to transform light output by backlight 120 into colored light of a particular pair-wise set of wavelengths. In some embodiments, a particular colored filter element may be common, to both pair-wise sets of wavelengths for a particular color. For example, a common red colored filter element may transmit different red wavelengths from different color sets. In other embodiments, a particular colored filter element may be coded to transmit wavelengths associated only with a particular color set. For example, a first red colored filter element may transmit a first red wavelength associated with a red LED from a first color set, but reflect a second red wavelength associated with a red LED from a second color set. Similarly, a second red colored filter element may transmit a second red wavelength associated with a red LED from a second color set, but reflect a first red wavelength associated with a red LED from a first color set.

Figure 3:
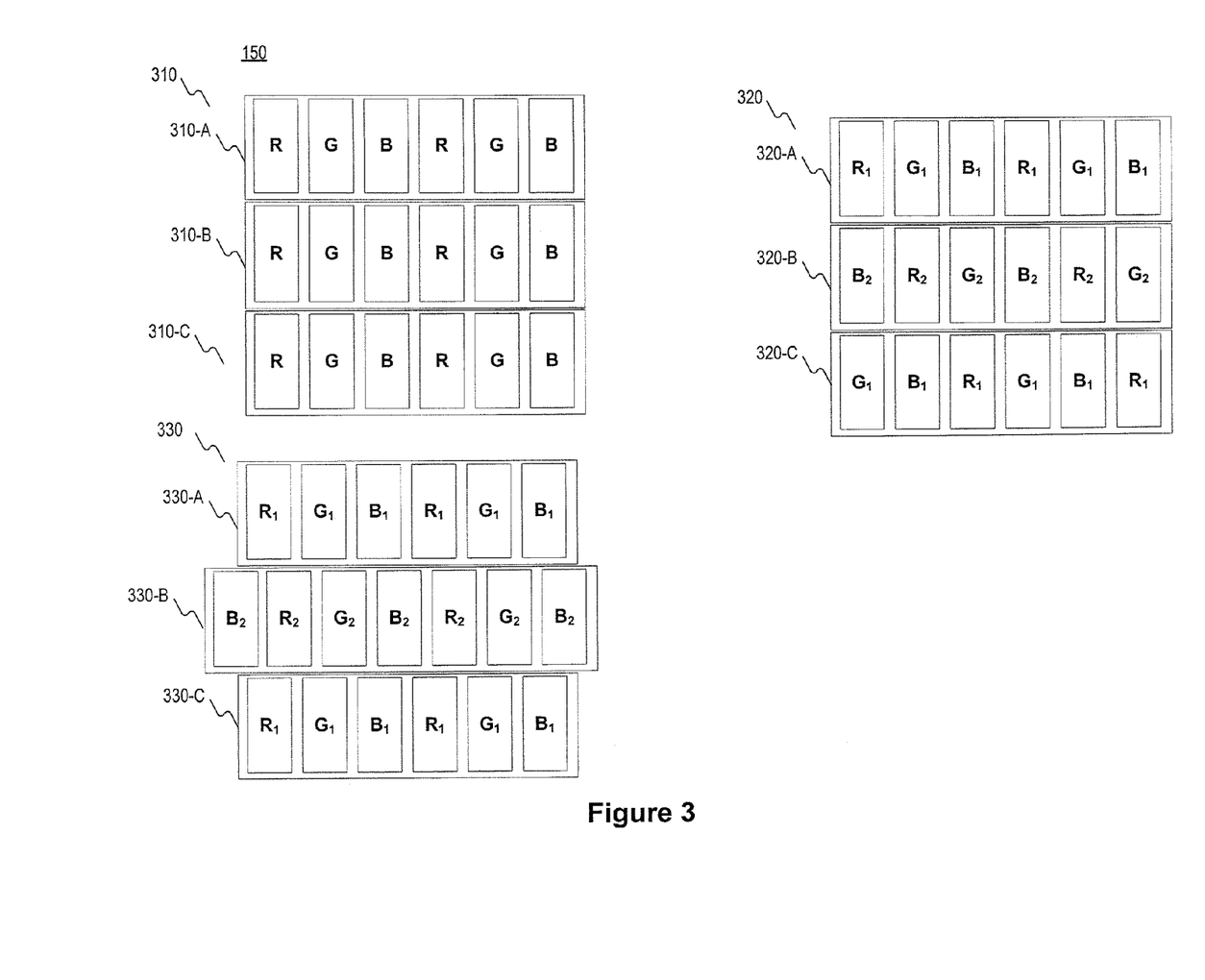
FIG. 3 shows a block diagram of exemplary color filter panels.

In some embodiments, color filter panel 150 may be coupled to LCD panel 140 using a sealant and one or more spacers to maintain sufficient spacing between color filter panel 150 and LCD panel 140. In some embodiments, color filter panel 150 may be composed of a glass substrate coated with dyes, pigments, or metal oxides to form individual colored filters. In other embodiments, the color filters may be a coating on an existing substrate on LCD panel 140. Each colored filter may be arranged in one of several patterns based on the arrangement of the corresponding pixels on LCD panel 140 as illustrated in FIG. 3. In certain embodiments, the color filters may be arranged in a random pattern (not shown) or a pseudo-random pattern (not shown) to provide secured viewing of display system 100. That is, by arranging the color filters in a random pattern, a displayed image may appear unrecognizable or scrambled to viewers not wearing viewing device 180.

In certain embodiments, color filter panel 150 may be comprised of strip filters arranged horizontally or vertically over each row or column of pixels on LCD panel 140. Unlike individual color filter elements previously discussed, complementary strip filter element may be adapted to transmit all wavelengths from one color set and to reflect or absorb the wavelengths from the remaining color set. Complementary strip filter elements may be placed adjacent to each other in a repeated pattern across color filter panel 150. Strip filter elements may be composed of multiple metal-organic layers configured to create a particular pass band.

Viewing device 180 may include one or more devices configured to enable a user to view full-color anaglyph three-dimensional imagery. Viewing device 180 may be a complete viewing device or a component of a viewing system. For example, viewing device 180 may include stereoscopic glasses with individualized filters separating left and right image perspectives. In some embodiments, each individualized filter may be adapted to receive and transfer to each eye of a user a specific set of wavelengths. In some embodiments, each individualized filter may be a multi-bandpass filter configured to receive a particular set of wavelength intervals grouped into a color set. For example, right-eye filter 180-A may be configured to receive and transfer wavelengths of a first color set associated with a right-eye image perspective. Wavelengths of a first color set may include red at 629 nm, green at 532 nm, and blue at 466 nm. Left-eye filter 180-B may be configured to receive and transfer a complementary set of wavelengths associated with a left-eye image perspective. Wavelengths of a second color set may include red at 615 nm, green at 518 nm, and blue at 432 nm.

Controller 170 may be one or more processing devices configured to execute processor readable instructions to perform functions associated with display device 110. For example, controller 170 may be a processor, application specific integrated circuit (ASIC), microcontroller, field programmable gate array (FPGA), or like device capable of executing processor readable instructions. In some embodiments, controller 170 may be coupled to communicate with backlight 120, LCD panel 140, and color filter panel 150 using bus 160. Bus 160 may include an optical or electrical communication channel configured to transfer data between backlight 120, LCD panel 140, color filter panel 150, and controller 170. In some embodiments, data may include display data received from an external source (not shown).

Figure 2:
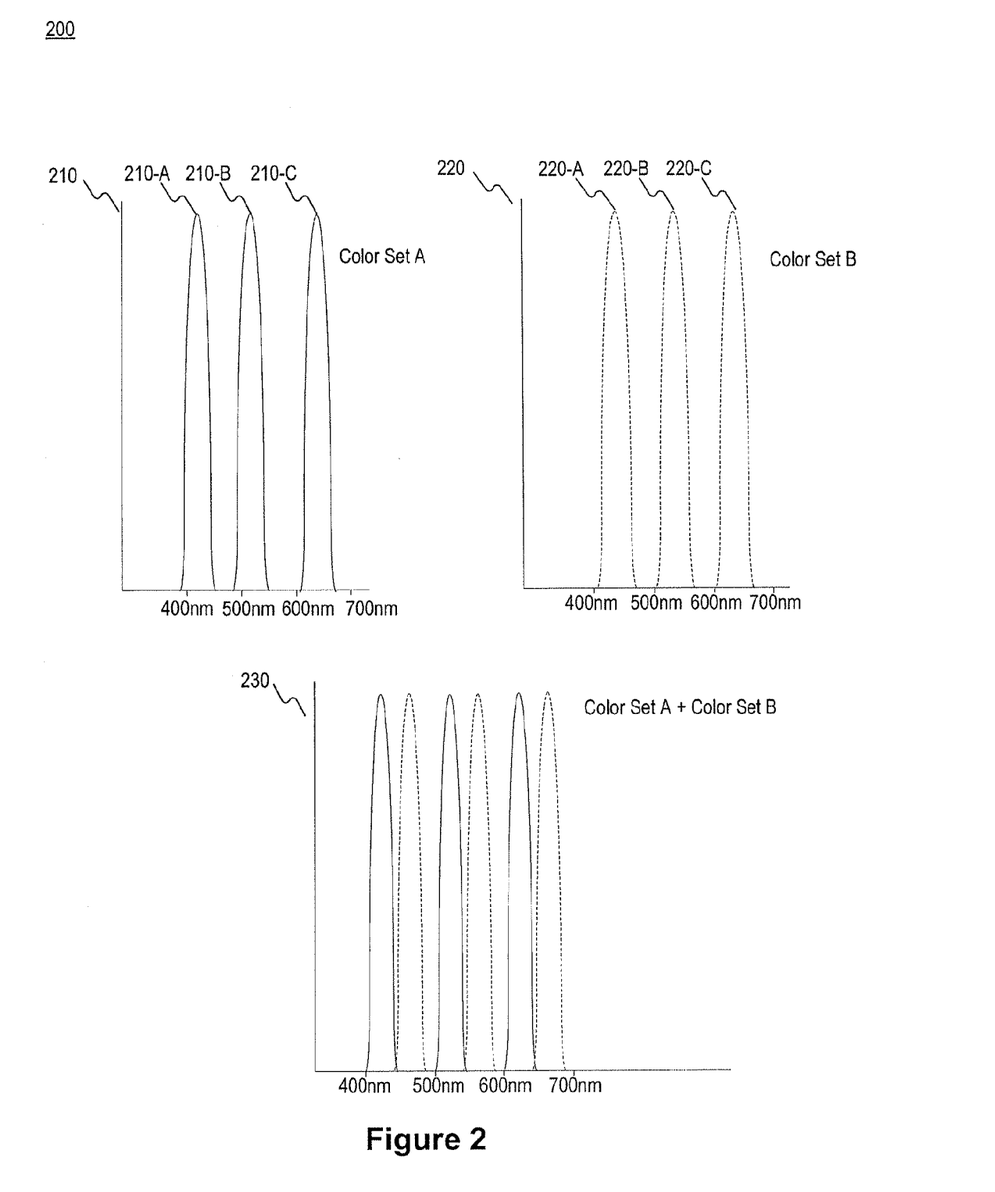
FIG. 2 illustrates a graph of the spectral transmission characteristics of exemplary color sets.

FIG. 2 illustrates graph 200 of the spectral transmission of exemplary color sets. As shown in FIG. 2, color set A may represent a first set of spectral peaks 210 of LEDs associated with a first color set of backlight 120. For example, a first blue LED may have a spectral peak of 466 nm 210-A. A first green LED may have a spectral peak of 532 nm 210-B. A first red LED may have a spectral peak of 629 nm. Color set B may represent a second color set of spectral peaks 220 of LEDs associated with a second color set of backlight 120. For example, a second blue LED may have a spectral peak of 432 nm 220-A. A second green LED may have a spectral peak of 518 nm 220-B. A second red LED may have a spectral peak of 615 nm. As shown in combined spectral transmission graph 230, color set A and color B may represent separate optical channels of common colors shifted in wavelength.

FIG. 3 shows a block diagram of an exemplary color filter panel 150. As shown in FIG. 3 and previously discussed, color filter panel 150 may include an array of individual color filter arranged in a particular pattern. In some embodiments, the pattern may be stripe pattern 310, mosaic patter 320, delta pattern 330, or other pattern. Each row of each pattern may be associated with a corresponding row of pixels or sub pixels of LCD panel 140. In some embodiments, each row may contain individual color filter elements each adapted to pass one or more wavelengths associated with a particular color set. For example, row 310-A may include a red color filter element R adapted to pass a wavelength associated with a first red LED, a second wavelength associated with a second red LED, or wavelengths associated with the first and the second red LEDs. In some embodiments, color filter panel 150 may include color filter elements adapted to pass one wavelength of a particular color on a first row and a different wavelength of the same color on a adjacent row. For example, row 320 A may include a blue color filter element $B_1$ configured to pass a first wavelength associated with a first blue LED, while reflecting or absorbing a second wavelength associated with a second blue LED. Similarly, row 320 B may include a different blue color filter element $B_2$ configured to pass a second wavelength associated with a second blue LED, while reflecting or absorbing a first wavelength associated with a first blue LED. In other words, color filter panel 150 may be configured to interlace complementary wavelength pairs of a common color. Color filter element pairs $R_1$ and $R_2$ and $G_1$ and $G_2$ located in rows 320-A, 320-B, 320-C, 330-A, 330-B, and 330-C may be configured to operate in a similar manner to color filter element pairs $B_1$ and $B_2$. In some embodiments, color filter elements associated with a particular color set may be arranged on a single row or across multiple rows.

Figure 4A:
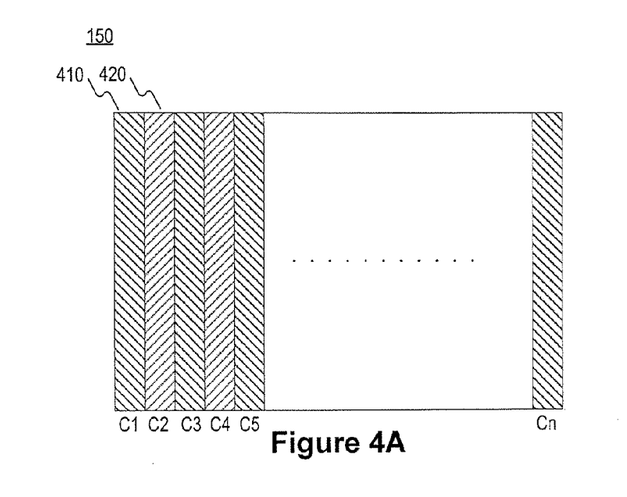
FIGS. 4A, 4B, 4C, and 4D show additional block diagrams of exemplary color filter panels and graphs of the respective spectral transmission characteristics of filter elements included in the panels.
Figure 4B:
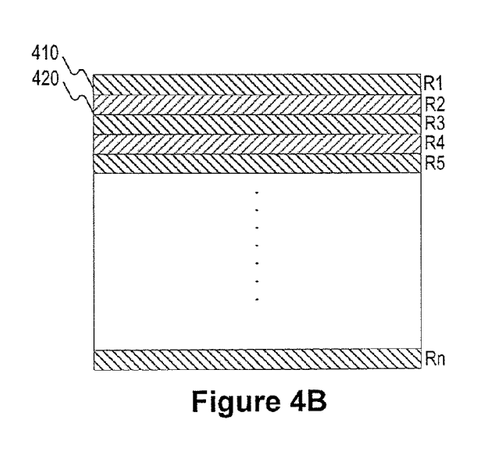
Figure 4C:
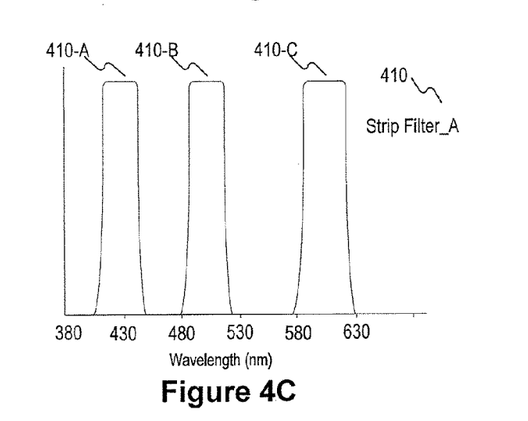
Figure 4D:
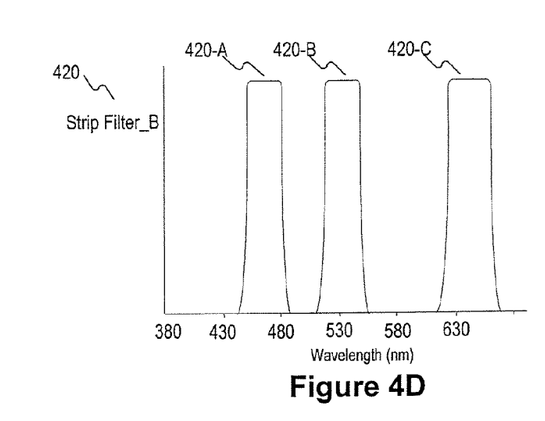

FIGS. 4A, 4B, 4C, and 4D show additional block diagrams of exemplary color filter panel 150 and graphs of the respective spectral transmission characteristics of the filter elements. In certain embodiments, color filter panel 150 may include a repeating pair of strip filter elements arranged horizontally or vertically across color filter panel 150. For example, in FIG. 4A, strip filter_A 410 and strip filter_B 420 are arranged vertically in an alternating manner. That is, strip filter_A 410 and strip filter_B 420 are placed in adjacent columns across color filter panel 150 corresponding to columns 1 through n of LCD panel 140. In other embodiments, as shown in FIG. 4B, strip filter_A 410 and strip filter_B 420 may be arranged horizontally and placed in adjacent rows across color filter panel 150 corresponding to rows 1 through n LCD panel 140. Each strip filter element may be adapted to transmit wavelengths from one color set and to reflect or absorb the wavelengths from the remaining color set. For example, as shown in FIG. 4C, strip filter_A 410 may include a filter that passes a first color set, which includes wavelengths centered at 432 nm, 518 nm, and 615 nm, while reflecting or absorbing other wavelengths. Complementary strip filter_B 420, as shown in FIG. 4D, may be adapted to pass wavelengths centered at 466 nm, 532 nm, and 628 nm, while reflecting or absorbing other wavelengths. Accordingly, a repeated pattern of strip filter_A 410 placed adjacent to strip filter_B 420, organized in rows or columns, may cover all pixels on LCD panel 140 with alternating rows or columns of a first color set and a second color set.

Figure 5:
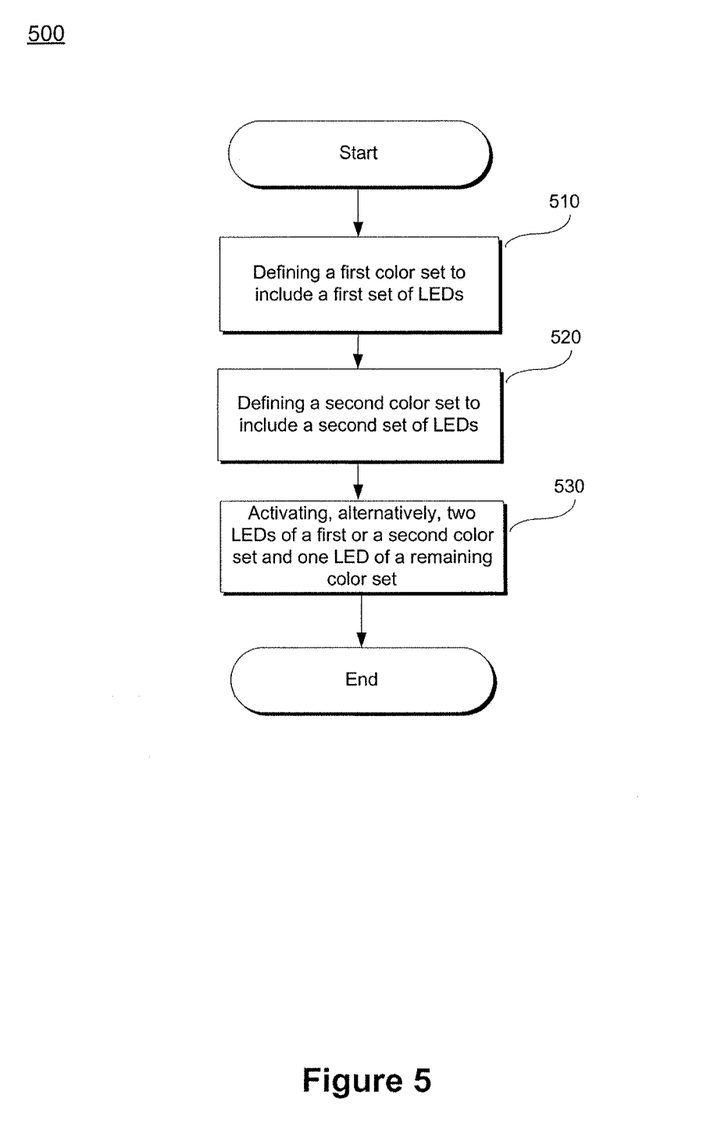
FIG. 5 shows a flowchart illustrating steps in an exemplary method for displaying full-color three-dimensional imagery.

FIG. 5 shows a flowchart illustrating steps in an exemplary method for displaying full-color three-dimensional imagery. It will be readily appreciated by one having ordinary skill in the art that the illustrated procedure can be altered to delete steps, move steps, or further include additional steps.

In step 510, a first color set is defined to include a plurality of LEDs. In some embodiments, the first color set may have a particular color spectrum corresponding to one of two image perspectives of a common multi-dimensional (typically 3D) image. Each image perspective may be color-coded using a particular color spectrum. For example, a right-eye image perspective may be color-coded with a color spectrum identified by a set of wavelengths corresponding to a set of colors used to code the image perspective. In some embodiments, the color sets may include pairs of red LEDs, pairs of green LEDs, and pairs of blue LEDs. In other embodiments, the color set may include greater or fewer pairs of LEDs, or other color combinations sufficient to reproduce the color-coded image perspective. For example, other color combinations may include red, yellow, green, cyan and blue LEDs. In step 510 a first color set is chosen, such that each LED has distinct spectral characteristics corresponding to spectral characteristics of the viewing device 180.

In step 520, a second color set is defined to include a plurality of LEDs with spectral characteristics distinct from the first color set as described in step 510. Accordingly, the second color set may have a particular color spectrum corresponding to a different image perspective. For example, a right-eye image perspective may be color-coded with a color spectrum associated with the first color set. A left-eye image perspective may be color-coded with a different color spectrum associated with a second color set. In some embodiments, the second color set may include a red LED, a green LED, and a blue LED. In other embodiments, the color set may include greater or fewer LEDs, or other color combinations sufficient to reproduce the color-coded image perspective. For example, other color combinations may include a red, a yellow, a green, and a blue LED. Each LED of the second color set may have distinct spectral characteristics as compared to each corresponding LED of the first color set. For example, the first color set may include a blue LED having a spectral peak of 466 nm, a green LED having a spectral peak of 532 nm, and a red LED having a spectral peak of 629 nm. The second color set may include a LEDs of corresponding to the same colors, having wavelengths of 432 nm, 518 nm, and 615 nm, respectively.

In step 530, each color-coded image perspective may be displayed by alternatively activating LEDs corresponding to an associated color set. For example, a right image-eye image perspective, associated with a first color set, may be displayed by activating only LEDs assigned to the first color set. Similarly, a left-eye image perspective, associated with a second color set, as previously described, may be displayed by activating only LEDs assigned to the second color set. In some embodiments, each color-coded image perspective may be displayed at a rate equal to one half of a frame rate. In some embodiments, including applications displaying a fusion of multi-spectral data on a single display, LEDs within one or multiple color sets may be activated one at a time. For example, certain types of spectral imagery, such as thermal imagery, may be coded using a single color or wavelength. Similarly, other spectral sources, such infrared imagery may be coded using another color. Imagery from one image source may be displayed by illuminating the corresponding LED is illuminated. Imagery from additional sources coded with a single LED may be displayed sequentially. In this manner many sources may be displayed during a single frame time. The dwell time of the pseudo color multi-spectral images would not be required to be equal between the images. In some embodiments, a single LED used to code spectral imagery for may be configured to produce a range of hues based on the pixel resolution determined by one or a combination of the controller and the backlight. For example, a yellow LED may be coded as 8-bits, thereby providing 256 possible hues of yellow. Pseudo color multi-spectral imagery coded using a single LED may also appear as stereoscopic imagery along with other three-dimensional imagery on a single display. For example, processing techniques may use common edges between visual stereoscopic imagery and multi-spectral imagery to create a parallax.

In some embodiments, a portion of each color-coded image may be display simultaneously. Displaying a portion of each image perspective may reduce visual discomfort experienced by a viewer resulting from a display switching between right-eye and left-eye image perspectives. In some embodiments, at least two LEDs of the first color set or the second color set and one LED of a different color set are activated together, while deactivating the remaining LEDs. For example, a portion of a right-eye image perspective may be displayed using a blue LED and a red LED associated with a first color set. Simultaneously, a portion of the left-eye image perspective may be displayed using a green LED. During the next display cycle, the remaining portions of the right-eye image and left-eye image perspectives may be displayed in a similar manner. Accordingly, both eyes of the viewer receive some light at all times, reducing the effects of switching characterized as flicker.

Figure 6:
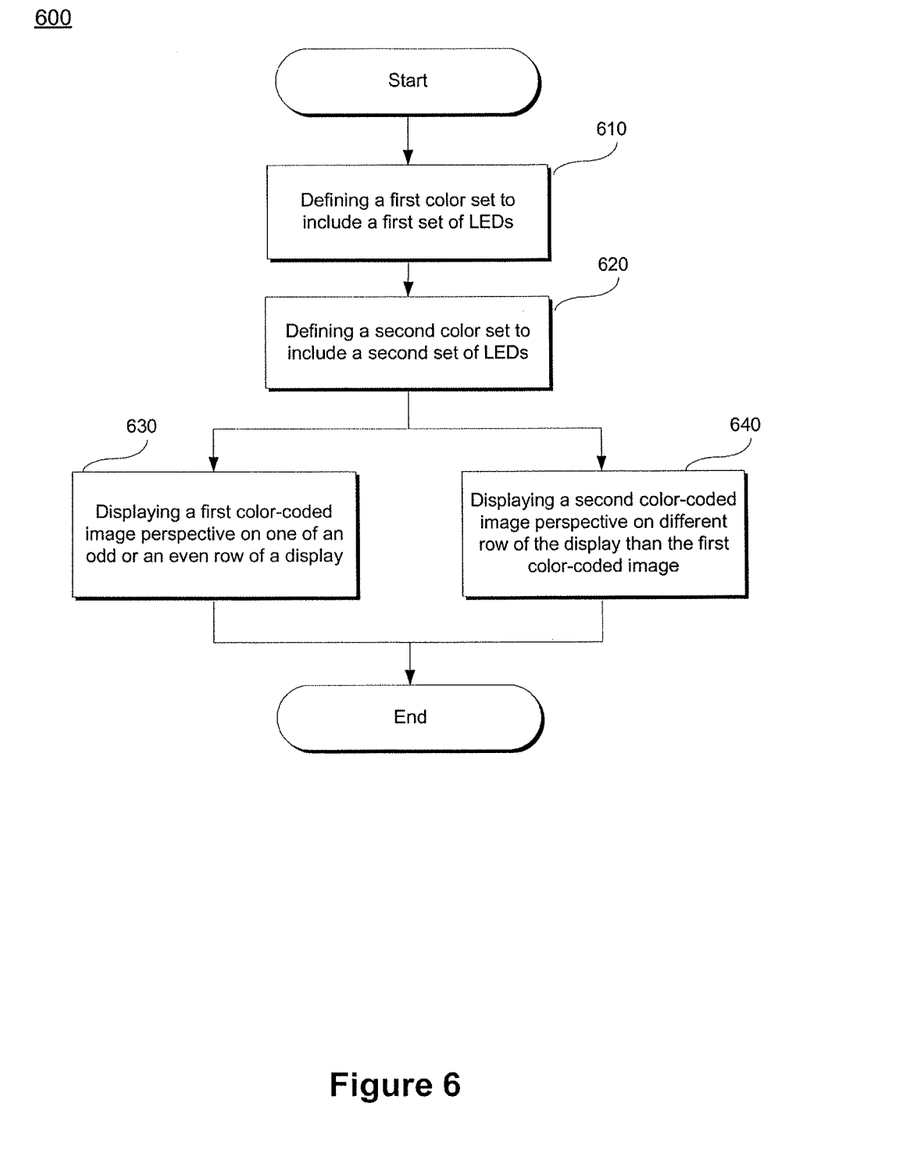
FIG. 6 shows a flowchart illustrating steps in an additional exemplary method for displaying full-color three-dimensional imagery.

FIG. 6 shows a flowchart illustrating steps in an additional exemplary method for displaying full-color three-dimensional imagery. It will be readily appreciated by one having ordinary skill in the art that the illustrated procedure can be altered to delete steps, move steps, or further include additional steps. Steps 610 and 620 include elements similar to those described in steps 510 and 520 respectively.

In step 630, a first color-coded image perspective is displayed on either the odd or the even rows or columns of a display in an interlaced manner. In other words, a particular color-coded image perspective, associated with one of a left-eye or right-eye image, may be displayed on either of the odd or the even rows or columns of a display. The remaining image perspective may be displayed simultaneously on the remaining rows or columns.

In some embodiments, separating each individual color-coded image perspective may be performed using rows of color filters coupled to each row of the display. In some embodiments, a row of color filters may include individual color filter elements, arranged in one of several patterns, such as those illustrated in FIG. 3. Each color filter element may have transmission characteristics suitable to pass a wavelength associated with the a particular color set and reflective and/or absorptive characteristics that prevent the transmission of other wavelengths. For example, a row of color filters, having a color spectrum associated with a first color set, may be coupled to each odd row of the display. The row may contain only color filter elements corresponding to the wavelengths associated with a first color set. Accordingly, only imagery coded with wavelengths associated with the first color set may be displayed on the odd rows of the display. In some embodiments, a row of color filters may include at least one color filter element associated with a different color set than the other color filter elements. For example, a row of color filters may include a green color filter element associated with a second color set and red and blue color filter elements associated with a first color set.

In other embodiments, separating each individual color-coded image perspective may be performed using strip filters as described in FIG. 4. The strip filters consists of a pattern of alternating rows or columns of spectrally distinct filter elements. That is, each strip filter element may transmit wavelengths from one color set and reflect or absorb the wavelengths from the remaining color set. Left and right image perspective data is displayed on alternating rows or columns based on the orientation of the strip filter elements. Accordingly, the resulting image may appear to have increased resolution because the image data appears in every row even though the pattern repeats on every other row.

Step 640 may be performed in a similar manner to step 630 as applied to a second color-coded image perspective.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method of displaying full-color three-dimensional imagery comprising:
    defining a first color set, having a first color spectrum, to include a first set of light sources, wherein the first color set is assigned to a first color-coded image perspective;
    defining a second color set, having a second color spectrum, to include a second set of light sources, wherein the second color set is assigned to a second color-coded image perspective;
    displaying the first color-coded image perspective on the first set of light sources, wherein displaying the first color-coded image perspective comprises passing wavelengths associated with the first color set through a first strip filter adapted to transmit the first color spectrum and to reflect or absorb the second color spectrum; and
    displaying the second color-coded image perspective on the second set of light sources.

2. The method of claim 1, wherein the first color spectrum, includes wavelengths corresponding to each of a first red LED, a first green LED, and a first blue LED.

3. The method of claim 1, wherein the second color spectrum, includes wavelengths corresponding to each of a second red LED, a second green LED, and a second blue LED.

4. The method of claim 1, wherein displaying the second color-coded image perspective comprises, passing wavelengths associated with the second color set through a second strip filter adapted to transmit the second color spectrum and to reflect or absorb the first color spectrum.

5. The method of claim 1, wherein the first color spectrum is different from the second color spectrum.

6. The method of claim 1, wherein the first color-coded image perspective is displayed on one of odd or even rows or columns of the display device, and the second color-coded image is displayed on the remaining rows or columns of the display device.

7. A computer readable storage medium storing instructions that, when executed by processor, causing the processor to perform steps comprising:
    defining a first color set, having a first color spectrum, to include a first set of light sources, wherein the first color set is assigned to a first color-coded image perspective;
    defining a second color set, having a second color spectrum, to include a second set of light sources, wherein the second color set is assigned to a second color-coded image perspective;
    displaying the first color-coded image perspective on the first set of light sources, wherein displaying the first color-coded image perspective comprises passing wavelengths associated with the first color set through a first strip filter adapted to transmit the first color spectrum and to reflect or absorb the second color spectrum; and
    displaying the second color-coded image perspective on the second set of light sources.

8. The computer readable storage medium of claim 7, wherein the first color spectrum, includes wavelengths corresponding to each of a first red LED, a first green LED, and a first blue LED.

9. The computer readable storage medium of claim 7, wherein the second color spectrum, includes wavelengths corresponding to each of a second red LED, a second green LED, and a second blue LED.

10. The computer readable storage medium of claim 7, wherein the first color spectrum is different from the second color spectrum.

11. The computer readable storage medium of claim 7, wherein displaying the second color-coded image perspective comprises passing wavelengths associated with the second color set through a second strip filter adapted to transmit the second color spectrum and to reflect or absorb the first color spectrum.

12. The computer readable storage medium of claim 7, wherein the first color-coded image perspective is displayed on one of odd or even rows or columns of the display device, and the second color-coded image is displayed on the remaining rows or columns of the display device.

13. An apparatus for displaying full-color three-dimensional imagery comprising:
   a first set of light sources defining a first color set, the first color set having a first color spectrum, wherein the first color set is configured to display a first color-coded image perspective;
   a second set of light sources defining a second color set, the second color set having a second color spectrum, wherein the second color set is configured to display a second color-coded image perspective;
   a light guide;
   a liquid crystal display;
   a first strip filter adapted to transmit the first color spectrum and to reflect or absorb the second color spectrum; and
   a second strip filter adapted to transmit the second color spectrum and to reflect or absorb the first color spectrum.

14. The apparatus of claim 13, wherein the first color spectrum, includes wavelengths corresponding to each of a first red LED, a first green LED, and a first blue LED.

15. The apparatus of claim 13, wherein the second color spectrum, includes wavelengths corresponding to each of a second red LED, a second green LED, and a second blue LED.

16. The apparatus of claim 13, wherein the first color spectrum is different from the second color spectrum.

17. The apparatus of claim 13, wherein the first color-coded image perspective is displayed on one of odd or even rows or columns of the display device, and the second color-coded image is displayed on the remaining rows or columns of the display device.

* * * * *